UNITED STATES PATENT OFFICE.

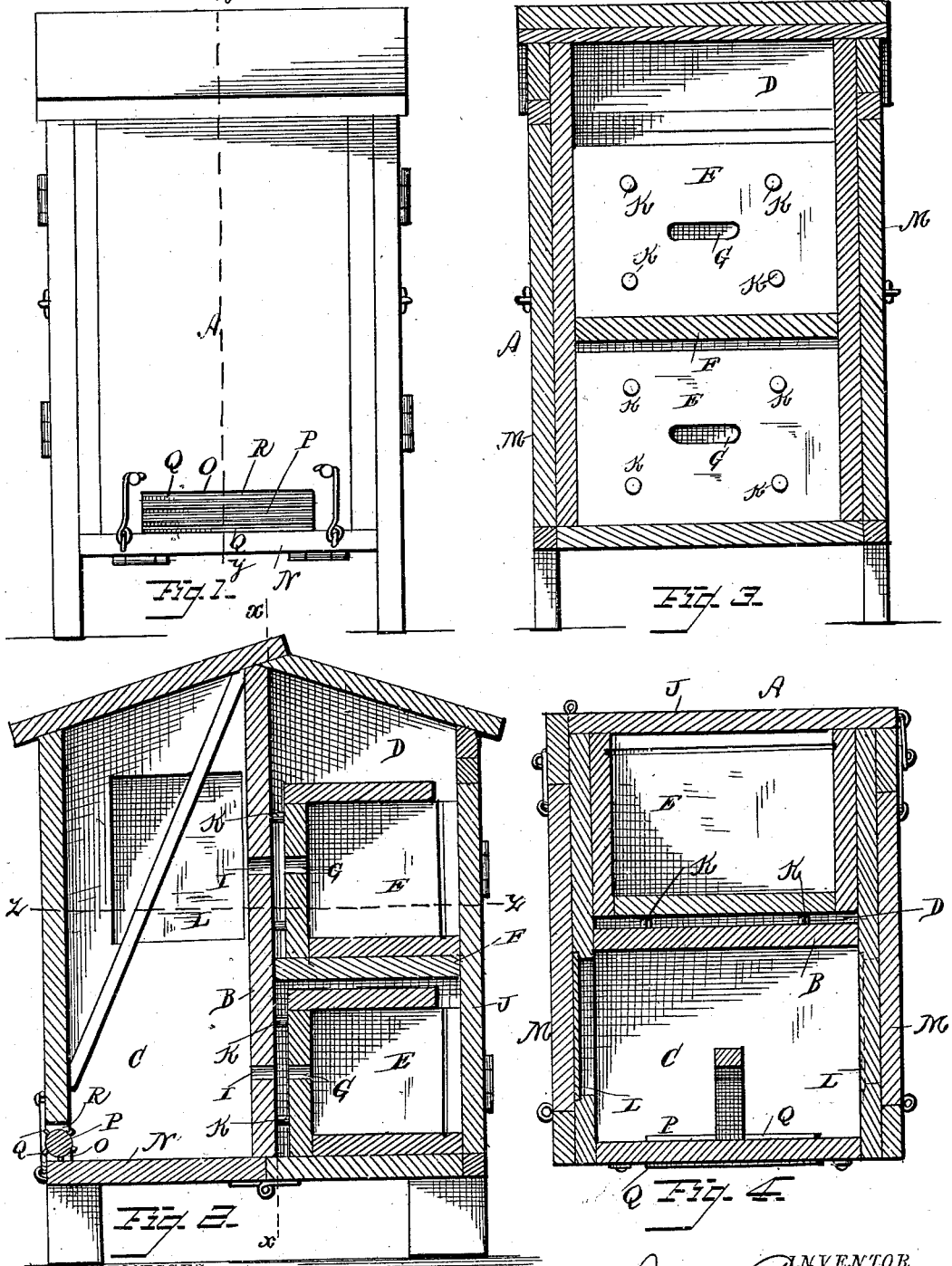

JOHN PHILLIPS, OF RILEY'S STATION, KENTUCKY, ASSIGNOR OF ONE-HALF TO THOMAS F. HOWLEY, OF SAME PLACE.

BEE-HIVE.

SPECIFICATION forming part of Letters Patent No. 272,975, dated February 27, 1883.

Application filed December 6, 1882. (No model.)

*To all whom it may concern:*

Be it known that I, JOHN PHILLIPS, a citizen of the United States, residing at Riley's Station, in the county of Marion and State of Kentucky, have invented a new and useful Bee-Hive, of which the following is a specification, reference being had to the accompanying drawings.

This invention relates to bee-hives, and is an improvement on the hive for which Letters Patent of the United States No. 264,898 were granted to myself on the 26th day of September, 1882.

My present invention consists in the improved construction and combination of parts, which will be hereinafter fully described, and particularly pointed out in the claim.

In the drawings hereto annexed, Figure 1 is a front elevation of my improved bee-hive. Fig. 2 is a longitudinal vertical sectional view of the same on the line $y\,y$ in Fig. 1. Fig. 3 is a vertical transverse sectional view taken on the line $x\,x$ in Fig. 2, and Fig. 4 is a horizontal sectional view of the hive on the line $z\,z$ in Fig. 2.

The same letters refer to the same parts in all the figures.

A in the drawings represents the hive-box, which is constructed substantially as shown, and provided with a vertical wall or partition, B, extending transversely from side to side of the hive-box, and dividing the latter into two compartments, C D, the former of which contains the comb-frames, (not shown in the drawings,) while the latter has the honey-boxes E E. Said honey-boxes, of which there may be any desired number, are separated by horizontal partitions F, and their inner sides are provided with holes G, registering with corresponding holes, I, in the partition-wall B. Access to the honey-boxes may be had through a door, J, hinged to the rear edge of one of the sides, and forming the rear part of the hive-box.

In order to prevent the bees, when the honey-boxes are pushed into place, from being caught and crushed between the inner ends of said boxes and the partition-wall, I provide said boxes with inward-projecting studs K, which will strike the partition-wall and prevent the ends of the honey-boxes from coming closely in contact therewith. This arrangement I find preferable to surrounding the holes G with flanges, which must be notched or slotted in order to permit the bees to crawl back if they should be caught between the ends of the honey-boxes and the partition-wall.

The sides of the hive are provided with windows L L, arranged at the top and bottom of opposite sides of the comb-frame compartment, in order to permit the latter to be inspected when required. The windows L L and the entire sides of the hive are covered by doors M M, which protect the windows and keep the interior of the hive warm and comfortable.

The front end of the bottom board of the box is hinged, as shown, so that it may be let down for the purpose of ventilating the interior of the hive. Above the hinged bottom, which is denoted by N, the front side of the hive has a slot, O, between the sides of which is journaled a roller, P, having longitudinal flexible flanges Q Q, which, when the roller is revolved, brush the bottom N, while between the said flanges and the top of slot O is a space, R, forming the bee-entrance. Moths, larvæ, and other depredators which attempt to enter the hive will attempt to enter under the roller P and deposit their eggs there. It will thus be seen that by simply turning the roller over, the moths, &c., will be swept out, when they can be easily destroyed.

My improved hive is simple, inexpensive, and in every respect useful for the purposes stated.

I claim as my invention—

The combination, with the hive-box having a slot in its front side adjoining the bottom, which is hinged, of a roller journaled between the sides of said slot, and having longitudinal flexible flanges, bearing against the bottom, while between said flanged roller and the top of the slot is left a space, forming the bee-entrance, as set forth.

In testimony that I claim the foregoing as my own I have hereto affixed my signature in presence of two witnesses.

JOHN PHILLIPS.

Witnesses:
WM. SEVERANCE,
THOS. F. HOWLEY.